United States Patent
Heidari et al.

(10) Patent No.: US 8,514,917 B1
(45) Date of Patent: Aug. 20, 2013

(54) METHOD AND APPARATUS FOR DSL COMMUNICATION OVER A 4 WIRE SYSTEM

(75) Inventors: Sam Heidari, Los Altos Hills, CA (US);
Qasem Aldrubi, Fremont, CA (US);
Felipe Fuks, Fremont, CA (US);
Hossein Dehghan-Fard, Danville, CA (US)

(73) Assignee: Ikanos Communications, Inc., Fremont, CA (US)

( * ) Notice: Subject to any disclaimer, the term of this patent is extended or adjusted under 35 U.S.C. 154(b) by 757 days.

(21) Appl. No.: 12/661,243

(22) Filed: Mar. 12, 2010

Related U.S. Application Data (60) Provisional application No. 61/159,760, filed on Mar. 12, 2009.

(51) Int. Cl.
*H04L 5/16* (2006.01)

(52) U.S. Cl.
USPC .......................................... 375/222; 375/219

(58) Field of Classification Search
USPC ................................ 375/222, 219
See application file for complete search history.

(56) References Cited

U.S. PATENT DOCUMENTS

| | | | | |
|---|---|---|---|---|
| 6,069,922 A | * | 5/2000 | Dyke | 375/285 |
| 6,625,116 B1 | * | 9/2003 | Schneider et al. | 370/226 |
| 6,731,678 B1 | * | 5/2004 | White et al. | 375/219 |
| 2002/0010818 A1 | * | 1/2002 | Wei et al. | 710/62 |

* cited by examiner

*Primary Examiner* — Shuwang Liu
*Assistant Examiner* — Michael Neff
(74) *Attorney, Agent, or Firm* — Mark J. Danielson; Pillsbury Winthrop Shaw Pittman LLP (57) ABSTRACT

A digital subscriber line 'XDSL' communication system for provisioning multi-tone modulated communications over two subscriber lines with two modems. The first modem has shared and discrete components forming a transmit path coupled exclusively to an end of a first of the two subscriber lines and a receive path coupled exclusively to an end of a second of the two subscriber lines. The second modem also has shared and discrete components forming a transmit path and a receive path having couplings of transmit and receive path components to corresponding opposing ends of the two subscriber lines diametrically opposite to those of the first modem, whereby the modems provision the first subscriber line exclusively for unidirectional communication from the first to the second modem, and provision the second subscriber line for unidirectional communication in the opposite direction, specifically from the second modem to the first modem. A related method and modem are disclosed.

12 Claims, 6 Drawing Sheets

FIG. 9A  Central Office Modem

FIG. 9B  Customer Premises Modem

METHOD AND APPARATUS FOR DSL COMMUNICATION OVER A 4 WIRE SYSTEM

CROSS REFERENCE TO RELATED APPLICATION

This application claims the benefit of prior filed Provisional Applications No. 61/159,760 filed on Mar. 12, 2009 entitled "DSL Communication over 4 Wire System" which is incorporated herein by reference in its entirety as if fully set forth herein.

BACKGROUND OF THE INVENTION

1. Field of Invention

This invention relates generally to communications, and more particularly, to a method and apparatus for multi-line digital subscriber line communications.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as xDSL have been developed to increase the effective bandwidth of existing subscriber line connections, without requiring the installation of new fiber optic cable. An xDSL modem operates at frequencies higher than the voiceband frequencies, thus an xDSL modem may operate simultaneously with a voiceband modem or a telephone conversation. Currently there are over ten discrete xDSL standards, including: G.Lite, ADSL, VDSL, SDSL, MDSL, RADSL, HDSL, etc. Within each standard there are at least two possible line codes, or modulation protocols, discrete multi-tone (DMT) and carrierless AM/PM (CAP).

XDSL modems are typically installed in pairs, with one of the modems installed in a home and the other modem, a.k.a. line card in the telephone companies central office (CO) switching office servicing that home. This provides a direct dedicated connection to the home from a line card at the central office on which the modem is implemented through the subscriber line or local loop. Each installation represents a sizeable expense in hardware and service labor to provision the central office and home. The expense may not always be amortized over a sufficient period of time due the relentless introduction of new and faster xDSL standards each of which pushes the performance boundaries of the subscriber line in the direction of increasing bandwidth and signal integrity. As each new standard involves, modems must typically be replaced to upgrade the service.

What is needed is a less rigid signal processing architecture that supports scalability of resources, and allows a more flexible hardware response to existing and evolving XDSL standards.

SUMMARY OF THE INVENTION

The present invention advantageously provides a method and apparatus for extending existing fiber and local area networks across digital subscriber lines, at matching data rates. The method and apparatus also allows data transport in any of a number of popular packet structure types including but not limited to: 802.X, ATM, etc.

In an embodiment of the invention a digital subscriber line 'XDSL' communication system for provisioning multi-tone modulated communications over two subscriber lines is disclosed. The system comprises two modems. The first modem has shared and discrete components forming a transmit path coupled exclusively to an end of a first of the two subscriber lines and a receive path coupled exclusively to an end of a second of the two subscriber lines. The second modem also has shared and discrete components forming a transmit path and a receive path having couplings of transmit and receive path components to corresponding opposing ends of the two subscriber lines diametrically opposite to those of the first modem, whereby the modems provision the first subscriber line exclusively for unidirectional communication from the first to the second modem, and provision the second subscriber line for unidirectional communication in the opposite direction, specifically from the second modem to the first modem.

In another embodiment of the invention an XDSL modem for provisioning XDSL multi-tone modulated communications over two subscriber lines is disclosed. The modem a plurality of shared and discrete components forming a transmit path and a receive path for modulating and demodulating an XDSL communication channel. The modem also includes a line interface component having two ports each configured to couple to one of the two subscriber lines and each of the two ports electrically isolated from one another and specifically not having any electrical bridge or hybrid coupling there between, and a one of the two ports electrically coupled exclusively to the transmit path and another of the two ports electrically coupled exclusively to the receive path, whereby the modem provisions the first subscriber line exclusively with a simplex communication channel modulated by the transmit path components and provisions the second subscriber line exclusively with an opposing simplex communication channel demodulated by the receive path components.

In another embodiment of the invention a method for operating an XDSL modem having shared and discrete components forming a transmit path and a receive path for multi-tone modulated XDSL communications is disclosed. The method comprises the acts of:

identifying two subscriber lines which couple a central office with a subscriber;

coupling transmit path components for multi-tone modulation of a communication channel exclusively to a first of the two subscriber lines identified in the identifying act;

coupling receive path components for multi-tone demodulation of the communication channel exclusively to a second of the two subscriber lines identified in the identifying act; whereby the two subscriber lines each provide simplex communications in opposing directions to one another, between the central office and the subscriber.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus is disclosed for coupling opposing modems together with two subscriber lines. The modems, a.k.a. line cards may be found in a central office, remote access terminal, business or home. The modems may be coupled directly or indirectly to digital subscriber lines via one or more optical or wireless links. The line cards support communication channels with differing degrees of robustness for multi-tone protocols including: asymmetric digital subscriber line (ADSL); very high bit rate digital subscriber line (VDSL) and other orthogonal frequency division multiplexing (OFDM) band plans including but not limited to the following:

TABLE 1

| Standard name | Common name | Downstream rate | Upstream rate |
|---|---|---|---|
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2 + M | 24 Mbit/s | 3.5 Mbit/s |
| ITU G.993.1 | VDSL | | |
| ITU G.993.2 | VDSL 2 | | |

Figure 1:
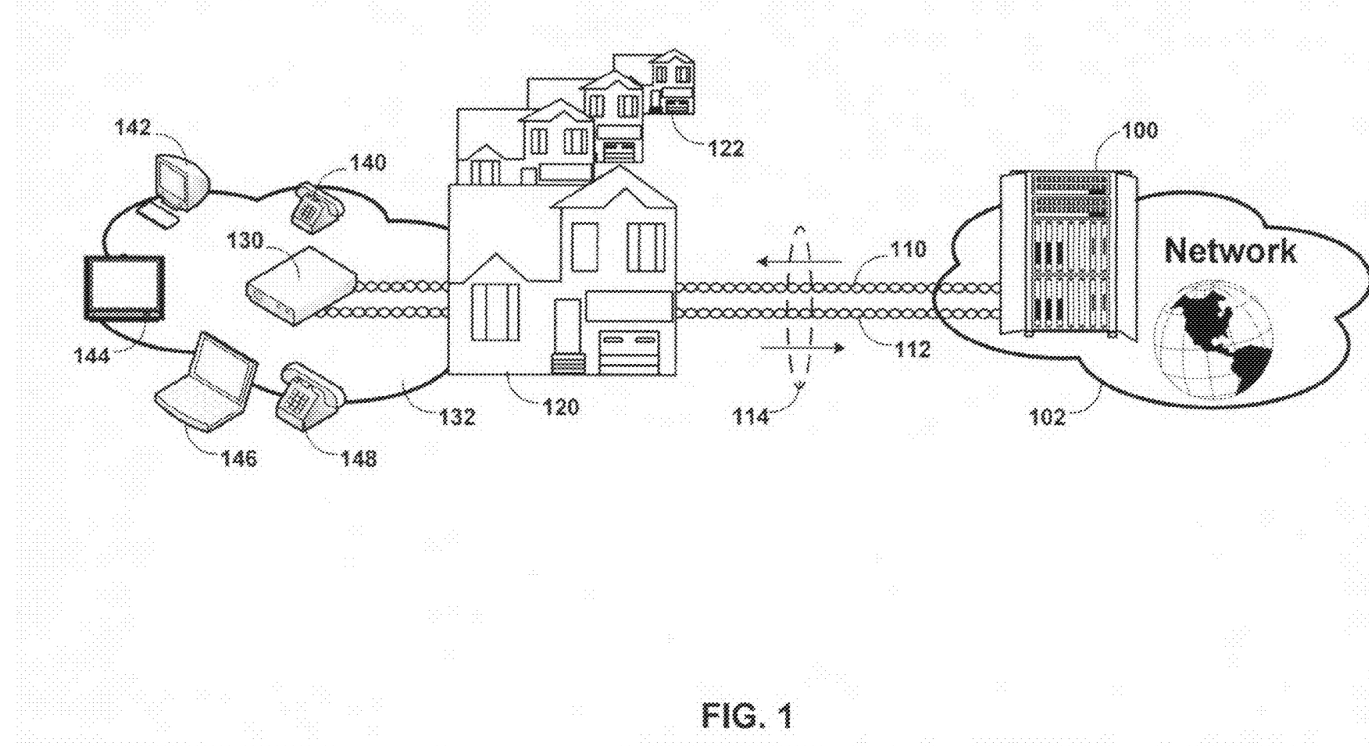
FIG. 1 shows an overall communication environment in which to practice the current invention including multi subscriber line service between a central office or remote access concentrator and a subscriber.

FIG. 1 shows an overall communication environment in which to practice the current invention including multi subscriber line service between a central office or remote access concentrator and a subscriber. A telco central office (CO) 100 is shown along with an associated internet and or telco backbone network 102. The CO services many local subscriber lines among them a bundle 114 including two subscriber lines 110 and 112 both of which couple the CO to a subscriber premises 120 within a neighborhood 122. Each subscriber line comprises two individual copper or aluminum wires, a.k.a. a twisted pair. Subscriber lines 110 and 112 collectively comprise two twisted pairs for a total of 4 wires. Opposing ends of subscriber lines 110-112 couple the CO to a two port modem 130 at the subscriber premises. The modem provides a local area network (LAN) 132 in the subscriber premises with an interface to both the Internet and the telco backbone 102 to which the CO is coupled. The subscriber's LAN couples to phones 140, 148, computers 142, 146 and television 144.

Figure 2:
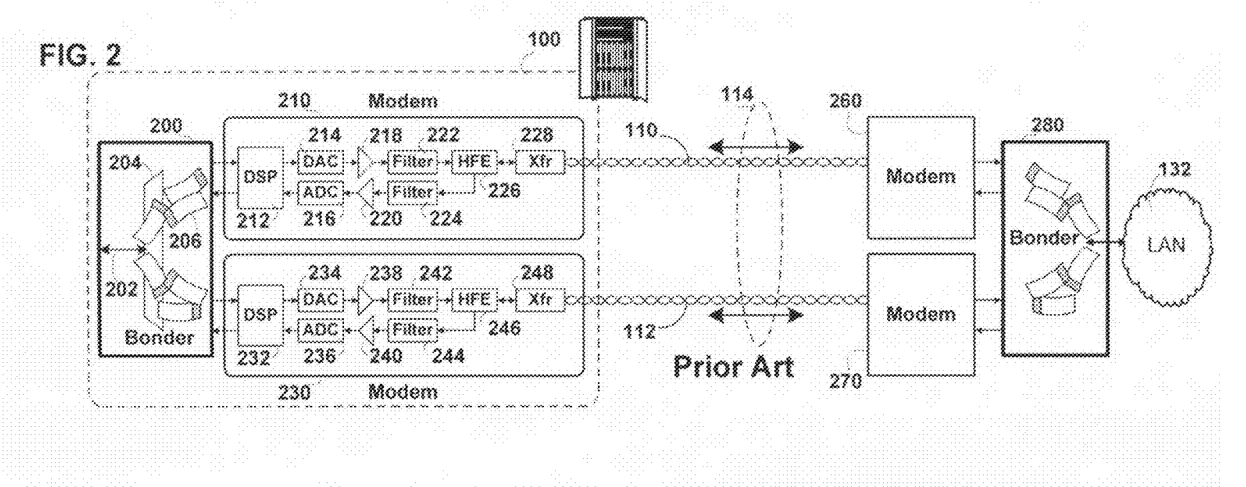
FIG. 2 is a hardware block diagram of an opposing pairs of prior art modems each coupled to a bonder for communicating across multiple subscriber lines.

FIG. 2 is a hardware block diagram of an opposing pairs of prior art modems each coupled to a bonder for communicating across multiple subscriber lines. This prior art arrangement requires a bonder and a pair of modems on each of the opposing ends of the subscriber lines, e.g. subscriber lines 110 and 112. Bonder 200 coupled via modems 210 and 230 to the subscriber lines 110 and 112 is shown at the CO 100. At the opposing end of the subscriber lines modems 260 and 270 are shown coupled to the subscriber LAN 132 via bonder 280. The bonder is required to multiplex transmitted and received data across both subscriber lines, e.g. subscriber lines 110 and 112. Bi-directional or duplex communications are provided on both subscriber lines. Bonder 200 multiplexes 204 the transmitted and received packets 206 of a communication channel 202 via both modems 210 and 230 across both subscriber lines 110-112.

Modem 210 includes a digital signal processor (DSP) 212 which handles both the modulation and demodulation of transmitted and received data. The analog portion of the transmit path includes a digital to analog converter (DAC), a line driver 218 and a bandpass or high/low pass filter to filter out unwanted interference from the received communication channel. The analog portion of the receive path includes an analog to digital converter (ADC), a low noise amplifier 240 and a bandpass or high/low pass filter to filter out unwanted interference from the transmitted communication channel. The transmit and receive paths are electrically coupled to one another by an electrical bridge circuit identified as a hybrid front end (HFE) 226. This may be single ended or differential. In either case the hybrid couples both the transmit and receive path to the subscriber line via a transformer 228. The transformer provides longitudinal signal isolation and surge protection and comprises 3 ports and two windings one for each transmission path.

The hybrid front end allows both the transmit and receive paths to couple to the same subscriber line and to provide duplex or bi-directional communications thereon. This capability comes at a price, specifically signal loss. Depending on the impedance balance the hybrid circuit of prior art modem design may result in significant leakage from the transmit path to the receive path limiting the data rate of the system.

Modem 230 includes identical components to those shown for modem 230. Specifically, a DSP 232, a DAC 234, an ADC 236, a line driver 238, a low noise amplifier 240, filters 242-244, an HFE 246 and a transformer 248.

Figure 3:
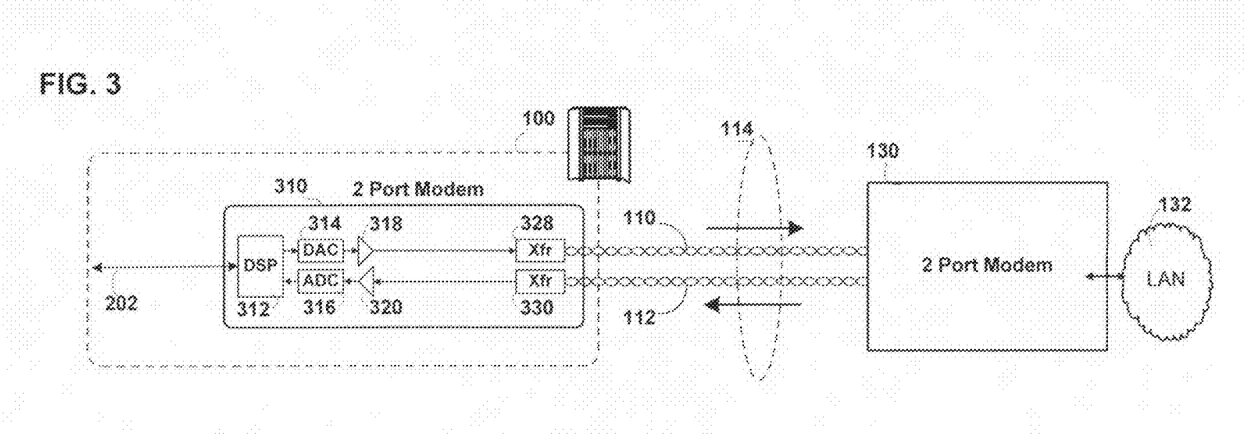
FIG. 3 is a hardware block diagram of opposing modems, of an embodiment of the current invention, each coupled to two subscriber lines for XDSL communications thereon.

FIG. 3 is a hardware block diagram of opposing 2 port modems 310 and 130, of an embodiment of the current invention, each coupled to two subscriber lines 110-112 for XDSL communications thereon. Modem 310 at the CO 100 modulates and demodulates the communication channel 202 on its' transmit and receive paths respectively. Modem 130 has a similar design to that shown for modem 310 and a diametrically opposite coupling of transmit and receive path components to the subscriber lines 110 and 112. Specifically, the transmit path components of modem 310 are coupled to one end of subscriber line 110 and the receive path components of modem 130 are coupled to the opposing end of subscriber line 110. Conversely, the receive path components of modem 310 are coupled to one end of subscriber line 112 and the transmit path components of modem 130 are coupled to the opposing end of subscriber line 112.

The modem 310 includes a DSP 312 which handles modulation and demodulation of the transmit and receive path communications respectively. The transmit path components further include: a DAC 314, a line driver 318 and a transformer 328 coupled exclusively to one of the subscriber lines, e.g. subscriber line 110. The receive path components further include: an ADC 316, a low noise amplifier 320, and a transformer 330 which couples the receive path exclusively to the other of the two subscriber lines e.g. subscriber line 112.

In contrast to the prior art bonding shown in FIG. 2, the 2 port modem of the current invention provisions each subscriber line exclusively with simplex or unidirectional portions of the communication channel. Each subscriber line handles exclusively one direction of communication, i.e. upstream or downstream. Thus, the prior art approach to line provisioning shown in FIG. 2, i.e. frequency division multiplexing (FDMA) is not required in the current invention.

The 2 port modem of the current invention implements an architecture which maximizes simplex data rates on each subscriber line. Specifically, the modem has no hybrid front end or bridge between transmit and receive paths, thus there is no leakage and resultant signal loss between the transmit and receive paths. The modem in an embodiment of the invention has no filters on either the transmit or receive path since there is no transmit to receive path leakage. The transformers required are simplified to a single coil 2 port design.

Additional cost savings may be realized by relaxing timing constraints, processor clock rates, and attendant power consumption for the remaining transmit and receive path components. These savings are realized by dispensing with the heretofore obligatory orthogonality between transmitted and received portions of the communication channel which is so critical in order to effect prior art frequency division multiplexed (FDMA) XDSL band plans. In prior art FDMA modems orthogonality requires transmit and receive path components to synchronize symbol and frame boundaries for both transmitted and received communications. The current invention by dedicating each subscriber line exclusively to simplex communications avoids the orthogonality constraint with which prior art modems are saddled. In an embodiment of the invention symbol and frame boundaries are no longer synchronized with the degree of precision associated with prior art designs.

Further cost savings may be realized by dispensing with dynamic impedance matching of transmit and receive paths and the attendant tradeoffs in transmit and receive signal strength required by prior art designs in which both paths couple to the same subscriber line. In an embodiment of the invention static impedance of the transmit path components and the subscriber line to which they are coupled is implemented entirely independently of static impedance matching of the receive path components and the other subscriber line to which they are coupled.

Figure 4:
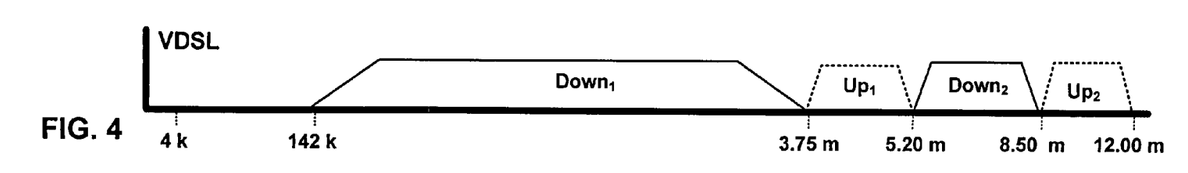
FIG. 4 is a signal diagram of a representative XDSL band plan, e.g. VDSL, in which frequency division multiplexing is used to support bi-directional, i.e. duplex, communication of a subscriber line.

FIG. 4 is a signal diagram of a representative XDSL band plan, e.g. VDSL, in which frequency division multiplexing is used to support bi-directional, i.e. duplex, communication of a subscriber line.

Figure 5A:
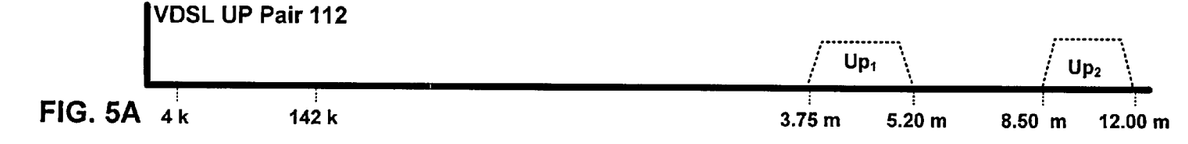
FIGS. 5A-5B and 6A-6B are signal diagrams of XDSL band plans in accordance with alternate embodiments of the current invention.
Figure 5B:
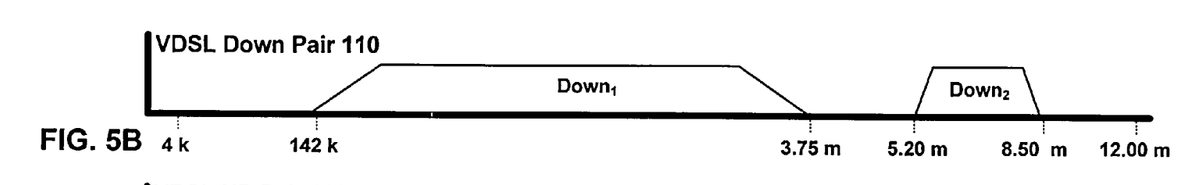

FIGS. 5A-5B and 6A-6B are signal diagrams of XDSL band plans in accordance with alternate embodiments of the current invention. In FIG. 5A the simplex band plan for subscriber line 112 is shown as limited to the upstream bands associated with the VDSL standard shown in FIG. 4. In FIG. 5B the simplex band plan for subscriber line 110 is shown as limited to the downstream bands associated with the VDSL standard shown in FIG. 4.

Figure 6A:
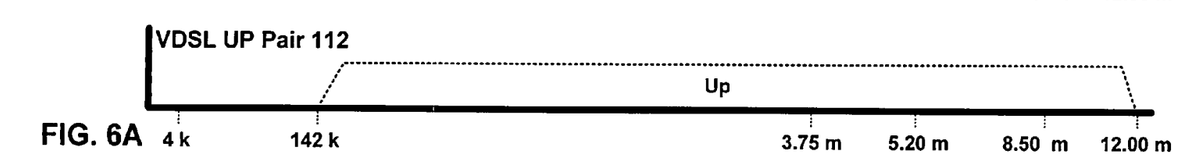
Figure 6B:
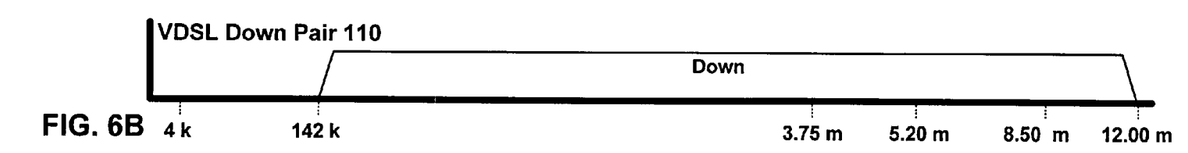
Figure 7:
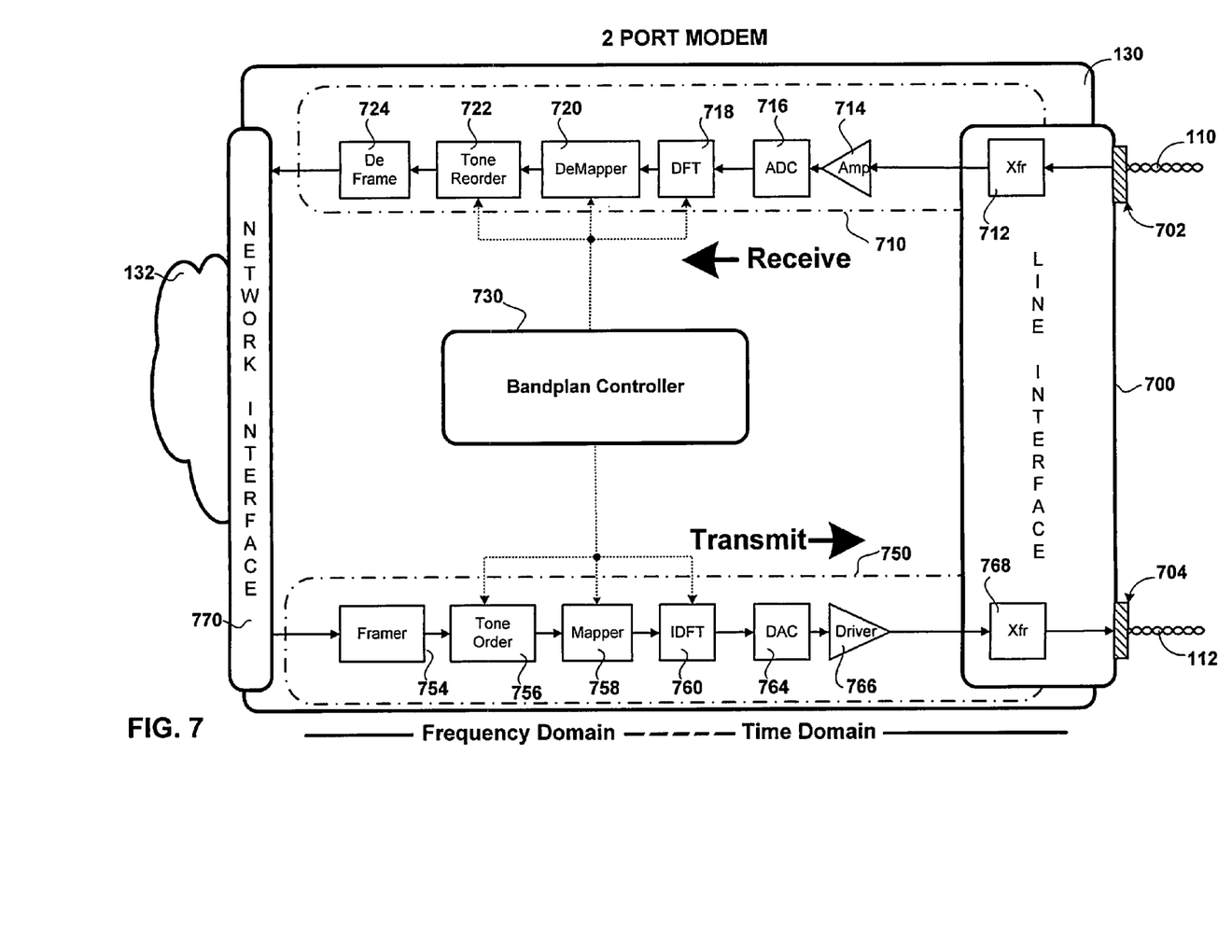
FIG. 7 is a detailed hardware block diagram of one of the modems shown in FIG. 3.

In an alternate embodiment of the invention shown in FIGS. 6A and 6B the entire available multi-tone modulated spectrum is dedicated to the simplex communications on each line. In FIG. 6A the entire VDSL range from 142 kHz to 12 MHz is devoted to simplex communications on subscriber line 112 from the subscriber to the CO, a.k.a. upstream communications. FIG. 6B shows the substantially identical and overlapping the spectral allocation for the other subscriber line 110 which is devoted to simplex communications from the CO to the subscriber, a.k.a. downstream communications over the same spectral range from 142 kHz to 12 MHz FIG. 7 is detailed hardware block diagram of an embodiment of a 2 port DMT modem 130 shown in FIG. 3.

The 2 port modem 130 in this embodiment of the invention includes both shared and discrete components coupled to one another to form a transmit path 750 and a receive path 710. The receive path and transmit path couple separately at one end via line interface 700 to the associated one of subscriber lines 110 and 112 for dedicated simplex downstream and upstream communications respectively. The line interface 700 does not include a hybrid front end or any other form of bridge. Thus, the transmit path and the receive path are not electrically coupled to the same subscriber line as is the case with prior art designs. The line interface does include, in an embodiment of the invention, two ports 702 and 704 each coupling a dedicated subscriber line to an associated one of the transmit path and the receive path. In an embodiment of the invention each port couples to the associated one of the transmit or receive paths via a transformer 712 or 768 for longitudinal signal isolation and surge protection. The transmit path and receive path couple at the opposing end via network interface 770 to an Ethernet or other Local Area Network (LAN) 132.

In an embodiment of the invention the spectral allocation on the transmit and receive paths is controlled by the band plan controller 730 which can configure the band plan on the subscriber lines to conform with that shown in either FIGS. 5A-5B or FIGS. 6A-6B as to required.

The dedicated components of the transmit and receive paths support DMT modulation and demodulation of data. In an embodiment of the invention the transmit path includes: a framer 754, a tone orderer 756, a constellation mapper 758, an inverse discrete Fourier transform (IDFT) component 760, a digital-to-analog (DAC) converter 764 and a line driver 766. The framer frames one or more discrete channels of communication channel data into frames, while the tone orderer parses the bit stream onto associated tones, the mapper maps the allocated bits for each tone or sub channel within each successive tone set, each of which corresponds to a symbol. The IDFT transforms the discrete tones in each tone set from the frequency to the time domain. The DAC converts the digital time domain data from the IDFT to an analog signal for amplification onto the associated subscriber line via the line driver.

In an embodiment of the invention the receive path includes: a low noise amplifier 714, an analog-to-digital (ADC) converter 736, a discrete Fourier transform (DFT) module 718, a demapper 720, a tone reorderer 722, and a deframer 724. The received signal is amplified by the low noise amplifier and then converted from analog to digital by the ADC. The stream of digitized samples from the ADC's is are passed to the DFT. The DFT performs a single transform from the time to the frequency domain of each successive symbol. The complex coefficients from the DFT are demapped in the demapper. After any associated tone reordering in the tone re-orderer, the resultant bit stream of the received communication channel is deframed in the deframer 444 and passed to the corresponding, phone, TV, computer, or network attached peripheral to which the modem is coupled via LAN 132.

In alternate embodiments of the invention the modem may be implemented as either a physical or a logical modem without departing from the scope of the claimed invention.

Figure 8:
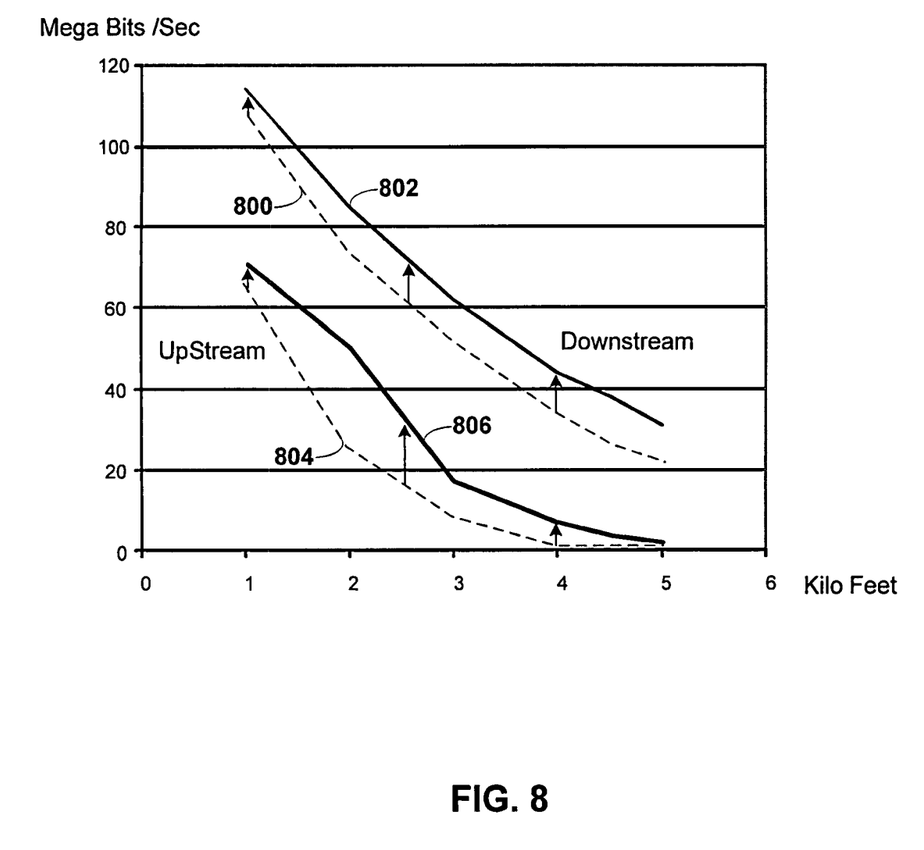
FIG. 8 is a graph showing data rate improvements afforded by the 4 wire modem of the current invention as shown in FIG. 3 versus prior art bonded sets of modems shown in FIG. 2.

FIG. 8 is a graph showing subscriber line length in kilo feet versus data rate in mega bits per second for the 4 wire modem of the current invention as shown in FIG. 3 versus prior art bonded sets of modems shown in FIG. 2. Upsteam and downstream rates using a VDSL band plan are shown separately. Solid line 802 represents the VDSL downstream data rate for the current invention 2 port modem using the band plan shown in FIG. 5B on the dedicated downstream subscriber line. Dashed line 800 represents the aggregate VDSL downstream data rate for a legacy modem with a bonder to allow downstream data transport on two lines using the downstream portion of the FDMA band plan of FIG. 4. Solid line 806 represents the VDSL upstream data rate for the current invention 2 port modem using the band plan shown in FIG. 5A on the dedicated upstream subscriber line. Dashed line 804 represents the aggregate VDSL upstream data rate for a legacy modem with a bonder to allow upstream data transport on two lines using the upstream portion of the FDMA band plan of FIG. 4.

Data rate improvements of 20% to 100% over prior art bundled duplex FDMA two wire designs may be realized with the simplex dedicated transmit and receive subscriber lines supported by the hybrid 2 port modem of the current invention and the band plans shown in FIGS. 5A-5B. Further data rate improvements may be realized by implementing the expanded overlapping band plans shown in FIGS. 6A-6B.

Figure 9A:
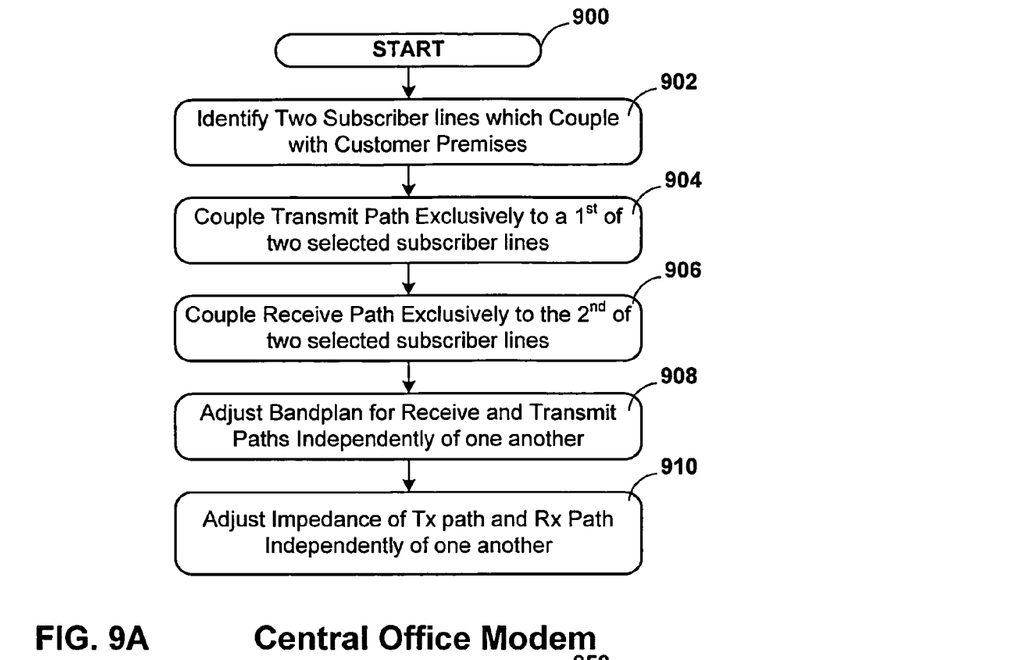
FIGS. 9A-9B are process flow diagrams of the processes associated with opposing modems in accordance with the current invention.
Figure 9B:
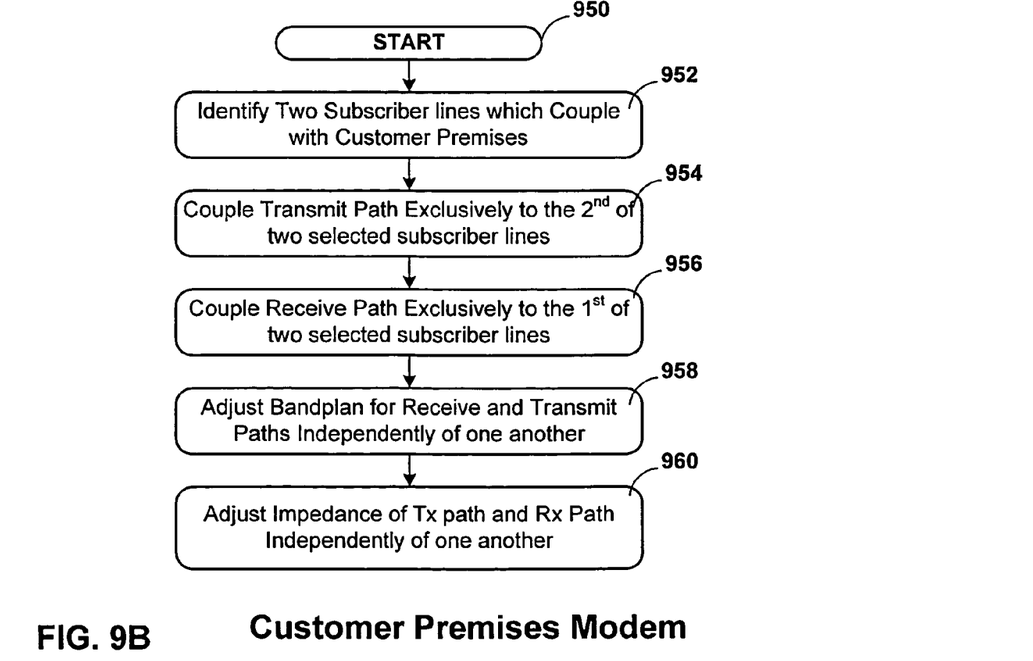

FIGS. 9A-9B are process flow diagrams of the processes associated with opposing modems in accordance with the current invention.

FIG. 9A shows the processes implemented at the central office modem or line card in accordance with an embodiment of the invention. After startup 900 control is passed to process 902 in which two subscriber lines which couple the CO with the customer premises are identified. Next in process 904 the transmit path of the CO modem is coupled exclusively to a $1^{st}$ of the two subscriber lines identified in the prior step. Then in process 906 the receive path of the CO modem is coupled exclusively to the $2^{nd}$ of the two subscriber lines identified in process 902. Next in process 908 any adjustments to the band plans of the receive and transmit paths are effected independently of one another. These adjustments may, for example, result in a change in band plan from that shown in FIGS. 5A-5B to that shown in FIGS. 6A-6B. Then in process 910 any adjustments of impedance in the transmit and receive paths are made independently of one another, since the lines are not bridged or hybrid coupled to one another.

FIG. 9B shows the processes implemented at the customer premises modem or line card in accordance with an embodiment of the invention. After startup 950 control is passed to process 954 in which the two subscriber lines which couple the CO with the customer premises are identified. Next in process 954 the transmit path of the CO modem is coupled exclusively to a $2^{nd}$ of the two subscriber lines identified in the prior step. Then in process 956 the receive path of the CO modem is coupled exclusively to the of the two subscriber lines identified in process 902. Next in process 908 any adjustments to the band plans of the receive and transmit paths are effected independently of one another and in concert with the CO modem. These adjustments may, for example, result in a change in band plan from that shown in FIGS. 5A-5B to that shown in FIGS. 6A-6B. Then in process 910 any adjustments of impedance in the transmit and receive paths are made independently of one another, since the lines are not bridged or hybrid coupled to one another.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A digital subscriber line 'XDSL' communication system for provisioning multitone modulated communications over two subscriber lines, and the communication system comprising:
   a first modem having shared and discrete components forming a transmit path coupled exclusively to an end of a first of the two subscriber lines and a receive path coupled exclusively to an end of a second of the two subscriber lines; and
   a second modem having shared and discrete components forming a transmit path and a receive path having couplings of transmit and receive path components to corresponding opposing ends of the two subscriber lines diametrically opposite to those of the first modem, whereby the first and second modems provision the first subscriber line exclusively for unidirectional communication from the first to the second modem, and provision the second subscriber line for unidirectional communication in the opposite direction, specifically from the second modem to the first modem,
   wherein the transmit path components of the first modem and the transmit path components of the second modem provision the first and the second of the two subscriber lines with multi-tone modulated communications across substantially identical and overlapping spectral ranges.

2. The XDSL communication system of claim 1, wherein the first and second modems each further comprise:
   an associated line interface component having two ports each configured to couple to one of the two subscriber lines and each of the two ports electrically isolated from one another and specifically not having any electrical bridge or hybrid coupling there between, and a one of the two ports electrically coupled exclusively to the transmit path of an associated one of the two modems and an other of the two ports electrically coupled exclusively to the receive path of the associated one of the two modems.

3. The XDSL communication system of claim 1, wherein the transmit and receive paths of both modems are electrically isolated from one another without any electrical bridge or hybrid coupling there between.

4. The XDSL communication system of claim 1, wherein the first and second modems implement communications in accordance with one of VDSL and VDSL 2 per the specifications of ITU G.993.1 and ITU G.993.2, respectively.

5. The XDSL communication system of claim 1, wherein the first modem comprises customer premises equipment (CPE) and is further coupled to a local area network (LAN), thereby providing XDSL communications access to the LAN.

6. An XDSL modem for provisioning XDSL multi-tone modulated communications over two subscriber lines, and the modem comprising:
   a plurality of shared and discrete components forming a transmit path and a receive path for modulating and demodulating an XDSL communication channel, and
   a line interface component having two ports each configured to couple to one of the two subscriber lines and each of the two ports electrically isolated from one another without any electrical bridge or hybrid coupling there between, and a one of the two ports electrically coupled exclusively to the transmit path and an other of the two ports electrically coupled exclusively to the receive path, whereby the modem provisions the first subscriber line exclusively with a simplex communication channel modulated by the transmit path components and provisions the second subscriber line exclusively with an opposing simplex communication channel demodulated by the receive path components,
   wherein the transmit and receive path components provision the first and the second of the two subscriber lines with multi-tone modulated communications across substantially identical and overlapping spectral ranges.

7. The XDSL modem of claim 6, wherein the plurality of shared and discrete components implement communications in accordance with one of VDSL and VDSL 2 per the specifications of ITU G.993.1 and ITU G.993.2, respectively.

8. The XDSL modem of claim 6, further comprising a network interface that is further coupled to a local area network (LAN), wherein the XDSL modem thereby provides XDSL communications access to the LAN.

9. A method for operating an XDSL modem having shared and discrete components forming a transmit path and a receive path for multi-tone modulated XDSL communications, and the method comprising:
   identifying two subscriber lines which couple a central office with a subscriber;
   coupling transmit path components for multi-tone modulation of a communication channel exclusively to a first of the two subscriber lines identified in the identifying act;
   coupling receive path components for multi-tone demodulation of the communication channel exclusively to a second of the two subscriber lines identified in the identifying act; whereby the two subscriber lines each provide simplex communications in opposing directions to one another, between the central office and the subscriber; and
   adjusting a bandplan for the transmit and receive paths independently of one another to expand a spectral range for the opposing simplex communications on the first and second subscriber lines.

10. The method for XDSL communication of claim 9 further comprising:
   adjusting impedance of the transmit and receive paths independently of one another to maximize a data rate for the transmitted and received simplex communication channel on the first and second subscriber lines respectively.

11. The method for XDSL communication of claim 9, wherein the transmit path components and receive path components implement communications in accordance with one of VDSL and VDSL 2 per the specifications of ITU G.993.1 and ITU G.993.2, respectively.

12. The method for XDSL communication of claim 9, wherein the subscriber is further coupled to a local area network (LAN), the method further comprising providing XDSL communications access to the LAN via the two subscriber lines.

* * * * *

UNITED STATES PATENT AND TRADEMARK OFFICE
CERTIFICATE OF CORRECTION

| | |
|---|---|
| PATENT NO. | : 8,514,917 B1 |
| APPLICATION NO. | : 12/661243 |
| DATED | : August 20, 2013 |
| INVENTOR(S) | : Heidari et al. |

It is certified that error appears in the above-identified patent and that said Letters Patent is hereby corrected as shown below:

In the Specification

In Column 6, Line 46, delete "as to required." and insert -- as required. --, therefor.

In Column 8, Line 2, delete "to the of the" and insert -- to the 1$^{st}$ of the --, therefor.

Signed and Sealed this
Twenty-second Day of October, 2013

Teresa Stanek Rea
*Deputy Director of the United States Patent and Trademark Office*